June 7, 1938.   W. LINDNER   2,119,678

SHAFT COUPLING

Filed April 22, 1936

Inventor: Walther Lindner
by Karl Viertel
Attorney

Patented June 7, 1938

2,119,678

UNITED STATES PATENT OFFICE 2,119,678

SHAFT COUPLING

Walther Lindner, Munich, Germany

Application April 22, 1936, Serial No. 75,837
In Germany May 2, 1935

5 Claims. (Cl. 64—15)

My invention relates to improvements in shaft couplings of the so called flexible types, which allow of transmitting power between shafts misaligned angularly or being positioned with the axes parallel though not in alignment.

The principal object of the invention is to provide an improved coupling of relatively simple design, which presents in addition to its flexible character indicated the following features combined:

(1) Great resiliency and cushioning capacity, namely which for the reasons given hereinafter should be far greater than with other couplings of the resilient or flexible types known heretofore, (2) high damping power with regard to heavy shocks or other sudden impulses received at regular intervals or irregularly, and (3) the absence of an intrinsic, definite frequency of oscillations—a highly desirable feature, which is intended to prevent the phenomenon of resonance occurring between the shafts coupled and will be more fully understood in the course of the following specification.

Briefly summarized the problem underlying this invention consists in effectively safeguarding rotary shafts for instance the propeller shafts of large ships driven by internal combustion or other engines of the reciprocating piston type by the improved coupling against accidental overloads and excessive strains, to which the shafts are subjected by heavy shocks and particularly through the phenomenon of resonance liable to occur, whenever the ship's motor runs at a critical speed, at which the frequency of the impulses transferred from the pistons to the motor crank shaft coincides with the individual number of oscillations per unit of time inherent to a characteristic of the respective propeller shaft, with which the motor crank shaft is coupled.

Various other objects aimed at by this invention will also become apparent hereinafter to practitioners in this field.

The nature and scope of this invention are briefly outlined in the appended claims and will be more fully understood from the following specification taken together with the accompanying drawing, in which—

Figure 1:
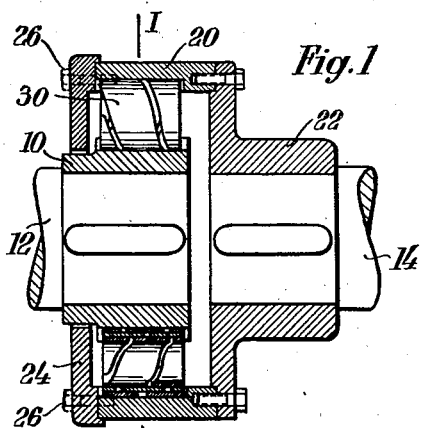
Figure 2:
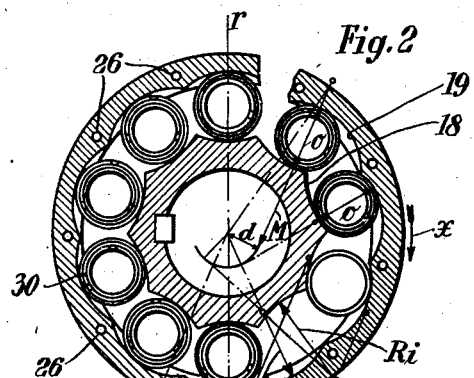
Figure 3:
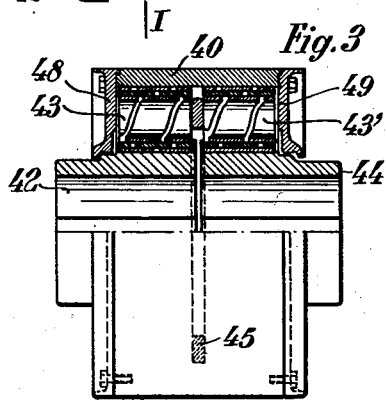
Figure 4:
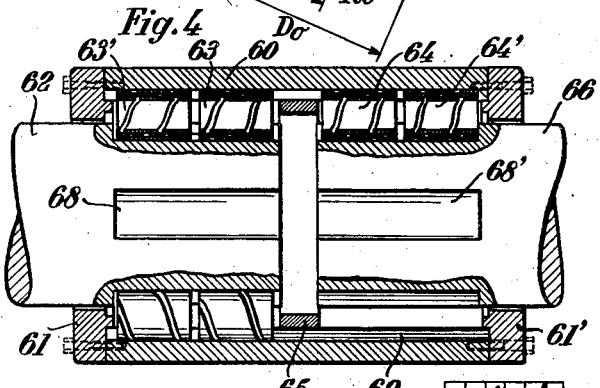
Figure 5:
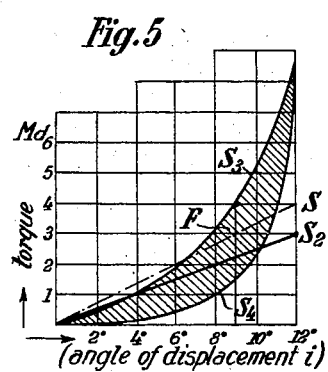
Figure 6:
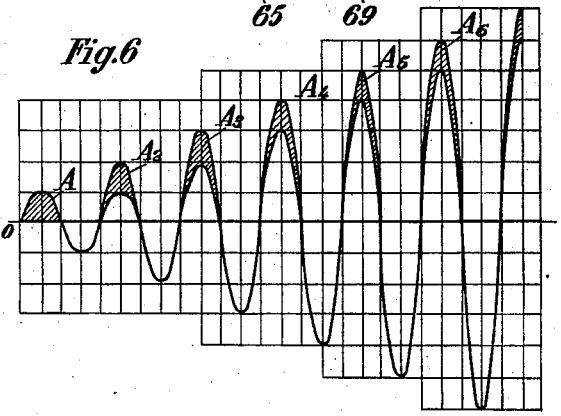
Figure 7:
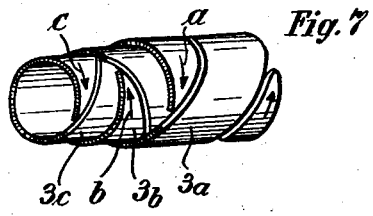

Fig. 1 is a section taken longitudinally through a coupling, designed according to this invention and being shown by way of an example, Fig. 2 is a cross section taken on line I—I in Fig. 1, Fig. 3 shows a structurally modified coupling designed according to this invention, shown partly in section, Fig. 4 is a section through another coupling of modified design, Figs. 5 and 6 are diagrams illustrating the most salient structural and working features of couplings designed according to this invention, and for comparison sake an objectionable feature to be avoided. Fig. 7 perspectively shows one of the roller shaped keys.

With the objects in view set forth above the improved coupling, embodying the salient ideas of this invention and being shown in Figs. 1 and 2, comprises:

I. Inner or primary coupling means, namely a hub 10 adapted to be keyed to one of the rotary shafts concerned, namely 12.

II. Outer or secondary coupling means, enclosing the primary ones in spaced relation thereto, namely a sleeve 20, surrounding said hub;

III. Intermediary coupling elements in the form of hollow resilient rollers 30, hereinafter called "keys", which interengage the inner and outer coupling members 10, 20 at recesses 18, 19 oppositely disposed thereon.

Said recesses 18, 19, hereinafter called "key ways" have curved—preferably arc shaped—bearing faces and are so amply proportioned as to their curvatures as to present roller tracks, causing the intermediate coupling elements to roll thereon and to be compressed by a wedge like action, when the coupling is in operation,—namely disproportionately to the angle $i$, through which key ways 18, 19 are displaced relatively to each other in circumferential direction, as seen in Fig. 2 at the right and in Fig. 5.

It has been found in the course of the inventor's experiments, that in order to ensure truly rolling motion on the part of the intermediary coupling elements 30, with no sliding and a minimum of wear, the radii of curvature, viz. the generatrices ($Ri$) of the inner roller tracks 18 and those ($Ro$) of the outer roller tracks 19 should be inversely proportionate to the respective distances $Di$, $Do$ of the lowest parts of said tracks from the center of the coupling, viz. ratio $Ri:Ro$ being equal to $Do:Di$.

In order to enhance the shock absorbing and vibration subduing effect of couplings provided with the key ways and resilient roller shaped keys according to this invention:

Each of said keys consists—preferably—of two or more helically wound springs, designated 3a, 3b, 3c in Fig. 7, which are closely nested within each other, so as to be in intimate frictional engagement with each other, said springs belarge surfaces of contact and being so designed as to their elasticity, that on being compressed by the wedge action of the approaching upturned ends of their respective key ways, as illustrated in Fig. 2 at the right, they will substantially retain their cylindrical shape and will show a high factor of elasticity combined with great damping power.

Good results have been obtained with keys consisting of three springs, each of which had only about two full windings, and which were covered all over with a lubricant consisting of a mixture of grease and pulverized graphite. The damping effect of said roller shaped resilient keys 30 may be enhanced to advantage by so nesting the springs 3a, 3b, 3c into each other, that their windings run in opposite directions to each other, as indicated by arrows a, b, c in Fig. 7.

Of the roller shaped key 30 shown in Fig. 7 the springs 3a, 3b, 3c, which are preferably of equal length, are shown—for the sake of elucidation—in staggered position to each other, viz. partly withdrawn from each other; the length of the largest spring 3a being preferably about equal to its diameter.

I attribute the extraordinary powerful and—for the purposes of this invention—highly desirable damping effect, which the improved coupling shows at work, namely in response to increases of torque, sudden impacts, shocks etc., to the high frictional resistance and large consumption of energy occurring at the relatively large faces of contact, viz. where the springs 3a, 3b, 3c, of which the keys 30 are composed, engage each other and slide over each other under high pressure namely in opposite directions, as indicated by the arrows a—b—c, on being compressed and on re-expanding.

Another advantage inherent to the keys of the design described accrues from the fact, that the damping effect of the coupling can be easily varied within large limits and adjusted to suit specific conditions for instance by nesting the springs 3a, 3b, 3c within each other in such position, that their faces of contact move in the same direction—instead of in opposite directions—on being compressed; or by changing the number of springs, of which the individual keys 30 are composed.

In the embodiment of the invention shown in Figs. 1 and 2 the secondary coupling means—sleeve 20—is attached to a flanged hub 22, adapted to be keyed to the other rotary shaft 14; a lid member 24 is detachably fixed to the sleeve 20 by screws indicated at 26; in its operative position said lid 24 will secure the keys 30 in their proper place preventing accidental axial displacement of the keys; on being detached the lid 24 will allow of the keys being withdrawn for inspection, cleaning, repair, re-adjustments etc. and particularly for setting the coupling out of operation.

Various other changes and modifications may be conveniently made in the structural details of couplings of the improved design described hereinbefore, without substantially departing from the spirit and the salient ideas of this invention.

With the shaft coupling shown in Fig. 3 by way of another example the primary coupling means comprise a pair of hubs 42, 44, adapted to be individually keyed to the opposed ends of the rotary shafts concerned (not shown), each hub being formed on its circumferential face with key ways of the design described with reference to Figs. 1 and 2; the secondary coupling means comprise a sleeve 40 surrounding said hubs in spaced relation thereto and presenting on its internal face key ways of the design and arrangement set forth above for cooperation with those of the hubs 42, 44; the roller shaped keys of the resilient design described for interlocking said hubs 42, 44 and sleeve 40 are arranged within the latter in two sets in series, namely in two sets 43, 43' spaced from each other; locking means are provided for preventing accidental displacement of said keys and sleeve in axial direction; said locking means comprise a distance ring 45, mounted within said sleeve intermediate said sets of keys, and lid members 48, 49 detachably fixed by screws on both ends of said sleeve.

The coupling shown in Fig. 3 is distinguished from that described with reference to Figs. 1 and 2 by its greater resiliency and greater damping power, which are due to the provision of a larger number of keys employed and to their specific arrangement in two sets, so as to work in series.

Fig. 4 shows a structurally modified coupling, in which still greater resiliency and damping power are combined with another valuable feature viz. relatively small size, as far as the outer diameter of the coupling is concerned.

The primary coupling means of the coupling shown in Fig. 4 comprise the opposed ends 62, 66 of the rotary shafts proper to be coupled, on the circumferential faces of which key ways 68, 68' are formed of the design set forth with reference to Figs. 1 and 2; the said secondary coupling means comprise a sleeve 60 surrounding said shaft ends in spaced relation thereto and presenting on its internal face key ways 69 of the design and arrangement set forth for cooperation with those of the shaft ends and with the said intermediary coupling means; the latter comprise four sets 63—63', 64—64' of roller shaped keys of the resilient design set forth, which are arranged in series within said sleeve,—namely in two pairs of key sets, which are axially spaced from each other, so that the keys 63, 63' interengage the sleeve 60 and the shaft end 62, while the keys 64, 64' interengage said sleeve 60 and the other shaft end 66; locking means are provided for preventing displacement of said keys and sleeve in axial direction;—said locking means comprise a distance ring 65, fixed within said sleeve 60 intermediate the innermost sets of keys 63, 64, and lid members 61, 61' detachably fixed on both ends of said sleeve.

The manner of operation of the improved couplings described hereinbefore and their characteristic working features, by which they are distinguished from other resilient and flexible couplings known before will now be explained more in detail with reference to Figs. 2, 5 and 6.

The fundamental principle governing the motion of gravity—actuated pendulums, viz. consisting therein, that with a pendulum of a specific length the oscillations occur in equal periods of time irrespective of the angle of oscillation—may it be 10° or 30°—holds good also with rotary shafts of steel or like systems capable of oscillating around their center of gravity in consequence of their resiliency and elastic properties.

Supposing the rotary shaft under consideration is locked at its rear end against rotation, said shaft would be angularly deformed or twisted by a torque, shock or other rotary impulse imparted to the front end of the shaft; the front section of the shaft would be angularly displaced relatively to the locked rear end of the shaft through a certain angle, which grows in direct proportion to the torque $Md$ and as seen from the equation $$i = \frac{180 \cdot L}{IE} \cdot Md$$

wherein L is the length of the shaft, $Md$ the torque, I the polar moment of inertia and E the modulus of the elasticity of the material of the shaft.

This behaviour of rotary shafts is illustrated in Fig. 5 by the straight diagram lines S and S2. From the lower line it appears that, whenever the shaft pertinent to line S is twisted through an angle of 4° by a torque $Md=1$, another torque of the value 2 will twist the same shaft through an angle of 8°.

In consequence of its resiliency the shaft twisted by an impulse will vibrate showing a definite number of oscillations per second like a gravity actuated pendulum, which are individually inherent to the shaft concerned and do not depend on the angle of twist.

As the result of the aforedescribed behaviour and working properties of rotary shafts the grave danger of resonance arises, well known amongst practitioners, which consists therein, that whenever synchronism occurs between the impulses transmitted to a rotary shaft, say to the propeller shaft of a ship—for instance from the explosions occurring in the cylinders of an internal combustion (Diesel) engine—say 10 times per second—and the vibrations peculiar of said shaft, the contortive deflections of the shaft will grow with every fresh impulse and may occasionally gain such proportions, namely if the synchronism continues long enough, that the shaft is overstrained and broken eventually.

This phenomenon of resonance is diagrammatically shown in Fig. 6. Therein the kinetic energy transmitted to the shaft under consideration by the first impulse—say from a Diesel-engine—and transformed by deformation of the shaft into potential energy is symbolized by the hatched area A, while the additional kinetic energies received by the next following impulses, which occur in resonance viz. with the same frequency, at which the shaft oscillates, are symbolized by the other hatched areas A2, A3, A4, A5, A6.

The danger of overstraining and breaking rotary shafts, which may be caused either by the aforedescribed phenomenon of resonance—namely regularly re-occurring impacts — or through irregularly occurring heavy shocks—as for instance in rolling mills, when a fresh block of steel to be worked is inserted—is effectively eliminated by coupling the shafts concerned through a coupling re-designed according to this invention. Practical tests, to which those couplings were subjected, have shown that their manner of working is characterized and distinguished from that of other flexible couplings known heretofore by the absence of a definite frequency of oscillations and by their extraordinary capacity of damping shocks;—these valuable features will be better understood from the curved diagram lines S3 and S4 in Fig. 5.

Therein the diagram line S3 shows the angle of displacement $i$ (see Fig. 2) of the primary and secondary coupling members relative to each other in their relation to torques of different values; it will be seen from the curved shape of line S3—and by comparison with the straight diagram lines S, S2 referred to above—that said angle $i$ does not grow in direct proportion to the torque but in an irrational manner or disproportionately thereto.

Because of this irrational character of angle $i$ the improved couplings have not a specific frequency of oscillations, which means, that in response to impulses the coupling will not oscillate at a fixed or definite but at an irrational, constantly changing frequency, and with the result, that resonance with the shafts coupled thereby cannot occur.

While the coupling and the shafts connected thereby are at rest and no rotary energy is transmitted the resilient keys 30 are in their central or idle position indicated by radial line $r$ in Fig. 2 at the left; when the coupling is on duty and torques or shocks are received say in the direction of arrow $x$—the keys 30 are displaced by rolling along their key ways 18—19 (see Fig. 2 at the right) into another position indicated by line $o$ and with result, that they are compressed to a slightly smaller diameter by the wedge action of the opposed ends of the key ways 18—19 approaching each other.

As explained above during the compression of the springs, of which the keys 30 consist and their re-expansion a considerable proportion of the kinetic energy received is absorbed by friction occurring at the interengaging surfaces of those springs; the energy thereby consumed is illustrated by the hatched crescent shaped area F in Fig. 6, bordered by diagram lines S3 and S4; the latter indicating, that the torque reproduced by the potential energy of the springs on re-expanding is considerably smaller than that received during the compression period, namely that a substantial proportion of the energy disappears because of being absorbed by friction.

The torque M transmitted through the keys 30 acts along line $o$ forming an angle with the radial line $r$, and on a leverage designated $d$ in Fig. 2. It will be noted in Fig. 2, that remarkably large angles $i$ of displacement amounting in practice to 6°—8°—10°—12° and more are obtainable with the improved coupling,—especially when compared with those of other flexible couplings well-known under various trade names, where said angle generally does not exceed 1°. The large angle $i$ of displacement, of which the improved coupling allows, accounts for its great resiliency and its high cushioning capacity, which jointly with the absence of a fixed innate frequency of oscillations and with the great damping power of the springs referred to above enables the coupling to operate at the same time as a highly flexible power transmitter, which compensates for misalignment of the shafts and as a safety device, which safeguards the rotary shafts coupled against accidental overstraining through resonance and heavy shocks.

Another noteworthy structural feature, by which the improved coupling is distinguished from its predecessors, and which will be noted also in Fig. 2, consists in the absence of abutments, or like fixed elements for limiting the movements of the resilient keys 30. Resilient couplings known heretofore are generally provided with stops for cooperation with the springs, namely intended to safeguard the latter against breakage through excessive bending and overstraining.

As a matter of fact, because of those stops the couplings concerned are safety devices only in a limited degree, namely only as far as the safety of the springs proper but not of the shafts coupled is concerned;—for as soon as the stops come into action the coupling obviously ceases to be resilient and will henceforth act like common rigid coupling.

It will be understood from the above specification, that and why the said drawbacks do not exist with the couplings re-designed according to this invention. From the absence of abutments or stops stopping the movements of the resilient keys 30 accrues another advantage: the absence of clicking or grating noises, which are often noticeable with other resilient couplings of known design particularly in cases where toothed gear wheels are driven by shafts coupled with internal combustion engines.

However the said key ways may be differently shaped to advantage in order to obtain, whenever called for, still larger angles $i$ of displacement of the primary and secondary coupling members relatively to each other, or to comply with other requirements, which may include giving the coupling another characteristic of specific shape differing from diagram line S3, or a different damping capacity.

I am aware that flexible shaft couplings are known in the art—for instance from the United States Patent 1,440,847 to Sundh,—wherein helical springs of special design, including barrel shaped springs, are used as intermediary coupling elements interengaging the inner and outer coupling members at recesses of semicylindrical shape, closely fitting around said springs, and in which said springs and recesses permit misalinement of the driving and driven shafts to a large extent;—and I make no claim to such springs and recesses,—more especially since the bearing faces of the "key ways" used in connection with my invention are more amply proportioned and so designed as to their curvatures as to present roller tracks, causing the intermediary coupling elements to actually roll thereon, and to be compressed in a specific disproportionate manner, when in action,—thus rendering the power transmitting device highly elastic in addition to its flexibility and to other features exhaustively explained hereinbefore.

It will be understood that my claims and my invention in its application are not limited to coupling rotary shafts in the strict sense of this term, since it obviously allows of transmitting rotational movements in a wider sense, including rocking or relative motions between the parts concerned and in both directions of rotation.

What I claim is:—

1. In a coupling device, the combination with an inner coupling unit, of an outer coupling unit surrounding the inner one in spaced relation thereto, recesses of relatively small depth formed in both coupling units in registration with each other so as to present pairs of curved roller tracks opposed and complementary to each other as to their wedging action, and resilient, rounded, intermediary coupling elements, engaging said roller tracks at relatively narrow lines of contact so as to truly roll thereon in circumferential direction, and to positively interengage by compression resistance said coupling units.

2. In a coupling device, the combination with an inner coupling unit, of an outer coupling unit surrounding the inner one in spaced relation thereto, recesses of relatively small depth formed in both coupling units in registration with each other, so as to present pairs of curved roller tracks opposed and complementary to each other as to their wedging action, and resilient, rounded, intermediary coupling elements in the form of helical sheet metal springs, engaging said roller tracks at relatively narrow lines of contact so as to truly roll thereon in circumferential direction, and to positively interengage by compression resistance said coupling units.

3. In a coupling device, the combination with an inner coupling unit, of an outer coupling unit surrounding the inner one in spaced relation thereto, recesses in both coupling units in registration with each other so as to present pairs of curved roller tracks opposed and complementary to each other as to their wedging action, and resilient, rounded, intermediary coupling elements, engaging said roller tracks so as to roll thereon in circumferential direction, and to positively interengage by compression resistance said coupling units,—the radii of curvature of the inner roller tracks and the radii of curvature of the outer roller tracks being inversely proportioned to the respective distances of the lowest points of said tracks from the axis of the coupling.

4. In a coupling device, the combination with an inner coupling unit, of an outer coupling unit surrounding the inner one in spaced relation thereto, recesses in both coupling units in registration with each other so as to present pairs of curved roller tracks opposed and complementary to each other as to their wedging action, and resilient, rounded, intermediary coupling elements, engaging said roller tracks so as to roll thereon in circumferential direction, and to positively interengage by compression resistance said coupling units,—said intermediary coupling elements comprising a plurality of relatively thin walled spring metal sleeves, formed with narrow slots helically running therearound, and which are frictionally nested within each other.

5. In a coupling device, the combination with an inner coupling unit, of an outer coupling unit surrounding the inner one in spaced relation thereto, recesses in both coupling units in registration with each other so as to present pairs of curved roller tracks opposed and complementary to each other as to their wedging action, and resilient, rounded, intermediary coupling elements, engaging said roller tracks so as to roll thereon in circumferential direction, and to positively interengage by compression resistance said coupling units, said intermediary coupling elements comprising a plurality of relatively thin walled spring metal sleeves, formed with narrow slots helically running therearound and which are frictionally nested within each other,—the windings of the slots of every two adjacently disposed sleeves running in opposite directions.

WALTHER LINDNER.